United States Patent
Rune

(10) Patent No.: US 7,292,592 B2
(45) Date of Patent: Nov. 6, 2007

(54) HOME NETWORK-ASSISTED SELECTION OF INTERMEDIARY NETWORK FOR A ROAMING MOBILE TERMINAL

(75) Inventor: Johan Rune, Lidingö (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 454 days.

(21) Appl. No.: 10/960,782

(22) Filed: Oct. 8, 2004

(65) Prior Publication Data

US 2006/0077926 A1    Apr. 13, 2006

(51) Int. Cl.
*H04L 12/28*   (2006.01)

(52) U.S. Cl. .................. 370/401; 370/328; 370/355; 370/356; 455/432.1; 455/435.1; 455/435.2

(58) Field of Classification Search ........... 370/342, 370/230, 218, 277, 338, 349, 252, 351, 355, 370/389, 390, 395.3, 241, 395.31, 395.32, 370/395.42, 395.52, 401, 400, 463, 331, 370/328, 352, 395.2, 432.1, 433; 455/422.1, 455/424, 425, 456.5, 456.6, 550.1, 435.2, 455/561, 433, 575.1, 435.1, 432.3, 432.1, 455/456.2, 435.3, 512, 133, 555, 554.1, 554.2, 455/426.1, 426.2, 436, 437, 445, 442, 438, 455/456.3; 713/161, 169, 170, 153; 726/4, 726/21

See application file for complete search history.

(56) References Cited

U.S. PATENT DOCUMENTS

| | | | |
|---|---|---|---|
| 5,570,084 A | 10/1996 | Ritter et al. | |
| 5,862,480 A | 1/1999 | Wild et al. | |
| 6,578,085 B1 | 6/2003 | Khalil et al. | |
| 6,879,584 B2 * | 4/2005 | Thro et al. | 370/352 |
| 6,895,434 B1 * | 5/2005 | Chandrupatla et al. | 709/223 |
| 6,904,055 B2 | 6/2005 | Pichna et al. | |
| 6,922,404 B1 | 7/2005 | Narayanan et al. | |
| 7,068,640 B2 | 6/2006 | Kakemizu et al. | |
| 7,080,151 B1 | 7/2006 | Borella et al. | |

(Continued)

FOREIGN PATENT DOCUMENTS

EP    1 376 973    1/2004

(Continued)

OTHER PUBLICATIONS

B. Aboba, M. Beadles, J. Arkko, and P. Eronen; "The Network Access Identifier;" Sep. 30, 2004.

(Continued)

*Primary Examiner*—Edward F. Urban
*Assistant Examiner*—Charles Chow
(74) *Attorney, Agent, or Firm*—Nixon & Vanderhye P.C.

(57) ABSTRACT

Home network-assisted selection of an intermediary service network for a roaming mobile terminal is disclosed. The selection is based on a list of desired intermediary service networks generated using information associated with the mobile terminal's home service network. In one example embodiment, the list is provided to a central access server, which provides this information to a local access network to which the mobile terminal is requesting access. The local access network selects one of the networks included on the list of desired intermediary service networks obtained from the central access server. This example embodiment uses existing protocols without modification, and can be used in conjunction with other intermediary service network selection procedures, if desired.

32 Claims, 6 Drawing Sheets

U.S. PATENT DOCUMENTS

| | | | |
|---|---|---|---|
| 7,151,931 B2 * | 12/2006 | Tsao et al. | 455/435.2 |
| 7,164,912 B2 | 1/2007 | Buckley et al. | |
| 7,167,705 B2 * | 1/2007 | Maes | 455/432.1 |
| 2001/0049790 A1 | 12/2001 | Faccin et al. | |
| 2002/0040390 A1 | 4/2002 | Sullivan et al. | |
| 2002/0068565 A1 * | 6/2002 | Purnadi et al. | 455/436 |
| 2002/0087674 A1 * | 7/2002 | Guilford et al. | 709/223 |
| 2002/0122394 A1 * | 9/2002 | Whitmore et al. | 370/328 |
| 2002/0197991 A1 | 12/2002 | Anvekar et al. | |
| 2003/0119481 A1 | 6/2003 | Haverinen et al. | |
| 2003/0176188 A1 * | 9/2003 | O'Neill | 455/433 |
| 2003/0177267 A1 * | 9/2003 | Orava et al. | 709/245 |
| 2004/0005892 A1 | 1/2004 | Mayer et al. | |
| 2004/0039827 A1 * | 2/2004 | Thomas et al. | 709/228 |
| 2004/0066756 A1 | 4/2004 | Ahmavaara et al. | |
| 2004/0068571 A1 | 4/2004 | Ahmavaara | |
| 2004/0073786 A1 * | 4/2004 | O'Neill et al. | 713/155 |
| 2004/0106393 A1 * | 6/2004 | Chowdhury et al. | 455/406 |
| 2004/0142658 A1 | 7/2004 | McKenna et al. | |
| 2004/0192306 A1 * | 9/2004 | Elkarat et al. | 455/435.2 |
| 2004/0228347 A1 * | 11/2004 | Hurtta et al. | 370/395.2 |
| 2004/0235476 A1 | 11/2004 | Martlew | |
| 2004/0249915 A1 | 12/2004 | Russell | |
| 2005/0002407 A1 | 1/2005 | Shaheen et al. | |
| 2005/0025091 A1 * | 2/2005 | Patel et al. | 370/328 |
| 2005/0037755 A1 | 2/2005 | Hind et al. | |
| 2005/0041650 A1 | 2/2005 | O'Neill | |
| 2005/0075129 A1 | 4/2005 | Kuchibhotla et al. | |
| 2005/0079869 A1 | 4/2005 | Khalil et al. | |
| 2005/0148299 A1 | 7/2005 | Buckley | |
| 2005/0153684 A1 | 7/2005 | Rodrigo | |
| 2005/0174945 A1 * | 8/2005 | Carrion-Rodrigo | 370/241 |
| 2005/0181788 A1 | 8/2005 | Muhonen | |
| 2005/0193150 A1 * | 9/2005 | Buckley et al. | 709/250 |
| 2005/0198294 A1 * | 9/2005 | Chandrupatla et al. | 709/225 |
| 2005/0272466 A1 | 12/2005 | Haverinen et al. | |
| 2005/0276229 A1 | 12/2005 | Torabi | |
| 2006/0045249 A1 * | 3/2006 | Li et al. | 379/126 |
| 2006/0111107 A1 * | 5/2006 | Zhang | 455/435.2 |
| 2006/0153135 A1 * | 7/2006 | Ascolese et al. | 370/331 |
| 2006/0166699 A1 | 7/2006 | Aghvami et al. | |
| 2006/0185013 A1 | 8/2006 | Oyama et al. | |
| 2006/0187892 A1 | 8/2006 | Zhang | |
| 2006/0251049 A1 | 11/2006 | Grimminger et al. | |
| 2007/0036120 A1 * | 2/2007 | Zhang et al. | 370/338 |

FOREIGN PATENT DOCUMENTS

| | | |
|---|---|---|
| WO | WO 03/037023 | 5/2003 |
| WO | 2004/017564 | 2/2004 |
| WO | 2004/064442 | 7/2004 |

OTHER PUBLICATIONS

International Search Report and Written Opinion of the International Searching Authority mailed Jan. 13, 2006 in corresponding Application PCT/SE2005/001345.

Related U.S. Appl. No. 10/960,783, filed Oct. 8, 2004; Inventor: Rune.

Related U.S. Appl. No. 10/960,780, filed Oct. 8, 2004; Inventor: Rune.

Related U.S. Appl. No. 10/960,781, filed Oct. 8, 2004; Inventor: Rune.

Vollbrecht et al., "AAA Authorization Framework", RFC 2904, IETF, Aug. 2000.

International Search Report and Written Opinion of the International Searching Authority mailed Dec. 27, 2005 in corresponding Application No. PCT/SE2005/001346.

3GPP TS 33.234 Vo. 6.0, Wireless Local Area Network (WLAN) Interworking Security (Release 6), Oct. 10, 2003.

\* cited by examiner

HOME NETWORK-ASSISTED SELECTION OF INTERMEDIARY NETWORK FOR A ROAMING MOBILE TERMINAL

CROSS-REFERENCES TO RELATED APPLICATIONS

This application is related to commonly-assigned application Ser. No. 10/960,780 entitled, "Terminal-Assisted Selection Of Intermediary Network For A Roaming Mobile Terminal", commonly-assigned application Ser. No. 10/960,783 entitled, "Enhancement of AAA Routing Originated from a Local Access Network Involving Intermediary Network Preference", and commonly-assigned application Ser. No. 10/960,781 entitled, "Enhancement of AAA Routing Initiated from a Home Service Network Involving Intermediary Network Preferences". The disclosures of these applications are incorporated by reference.

FIELD OF THE INVENTION

The present invention relates to a method and apparatus for establishing a connection via an access network, for example, a wireless local area network (WLAN) communicating with at least one mobile terminal and at least one service access or backbone network that includes a mobile terminal authentication and/or authorization process to obtain service. In this regard, the present invention generally relates to interworking a local wireless access network like a WLAN (e.g., based on IEEE 802.11) and public land mobile networks (PLMN) like a universal mobile telecommunications system (UMTS) network, and in particular, to roaming and authentication, authorization, and/or accounting (AAA) configurations for such networks. But the invention may be applied to other types of wireless access networks and PLMNs.

BACKGROUND AND SUMMARY

Wireless communications have enjoyed tremendous growth and permit both voice and data communications on a global scale. Indeed, WLAN access networks are currently deployed in many public places, such as airports, hotels, shopping malls, and coffee shops. The WLAN market is currently undergoing a rapid expansion and is being offered as a complementary service for mobile operators. PLMN core network operators, such as GPRS and UMTS network operators, traditionally provide access to mobile packet data services via a wide area GPRS or UMTS network. More recently, those mobile operators have also offered that mobile packet data service directly through a high capacity WLAN access network. Ideally, the mobile operators can provide the packet data service seamlessly between PLMN and WLAN.

There are several important requirements for a mobile operator's complementary WLAN service. First, the WLAN must interwork PLMN, e.g., GPRS and UMTS, established standards. GPRS and/or UMTS are used as non-limiting examples of a PLMN. Specifically, it must be possible to reuse existing GPRS/UMTS authentication and authorization mechanisms for WLAN access without degrading the security of the GPRS/UMTS network. Second, roaming must be permitted and specified between wide area cellular radio access and WLAN access networks. Significantly, roaming between different mobile operator WLANs must be supported. A WLAN access network may have a direct or an indirect relationship with one or more service networks.

FIG. 1 illustrates an access configuration where a mobile terminal (MT) 10 initially requests access via a local access network 12. Local access network 12 typically provides "hotspot" wireless connectivity for WLAN clients like the mobile terminal 10 present in its local access coverage area. The local access network 12 is connected to a home service network 14, which provides the ultimate communication service and maintains the direct relationship to the mobile terminal 10. The local access network 12 includes one or more access points 16 (e.g., radio base stations) that provide access to the communication services over the radio or wireless interface. An access router 18 is the data gateway to the Internet and/or an Intranet 13 and to the home service network 14, and it routes data between the mobile terminal 10 and the home service network 14 (although the data path between the access router 18 and the home service network 14 is not shown). The authentication, authorization, and accounting (AAA) server 20 is involved in performing authentication and authorization of the mobile terminal 10 before access to services are permitted. The AAA server 20 is also involved in accounting functions once access is permitted. The home AAA server 24 is coupled to a home subscriber server (HSS) 22, which accesses a home subscriber server data base (not shown). The home AAA server 24 authenticates and authorizes the mobile terminal using authentication and authorization procedures which are often performed using the well-known RADIUS or Diameter protocols.

FIG. 2 illustrates how the local access may have an indirect (i.e., via an intermediary) relationship with a home service network. The local access network has an association with intermediary service networks 30, 34, and 38, and each intermediary service network has its own AAA server 32, 36, and 40, respectively. But only two intermediary service networks 30 and 34 have roaming agreements with the home service network 14. Although not illustrated, there may also be a network (or even multiple networks) between the local access network and the intermediary service networks 30, 34, and 38 in the form of a "roaming consortium."

When a UMTS/WLAN subscriber accesses a WLAN access network, the subscriber's terminal sends a network access identifier (NAI) of the subscriber to the network. An NAI is an identifier with format "name@operator-realm," as described in "The Network Access Identifier," RFC 2486, January 1999. The NAI is sent using Extensible Authentication Protocol (EAP) over LAN (EAPOL). The transfer of the NAI precedes either an EAP Authentication and Key Agreement (AKA) procedure, as described in "EAP AKA Authentication," J. Arkko et al., Internet-Draft draft-arkko-ppext-eap-aka-10.txt, or an EAP Subscriber Identity Module (SIM) procedure, as described in "EAP SIM Authentication," H. Haverinen et al., Internet-Draft draft-haverinen-pppext-eap-sim-11.txt. The AAA client located in the WLAN AP 16 or the access router 18 (most commonly in the AP) forwards the NAI via an AAA protocol to a service network AAA server, (e.g., RADIUS, as described C. Rigney et al., "Remote Authentication Dial In User Service (RADIUS)," RFC 2865, or Diameter, as described in Pat R. Calhoun et al., "Diameter Base Protocol" RFC 3588, Pat R. Calhoun et al., "Diameter Network Access Server Application," Internet-Draft draft-ietf-AAA-diameter-nasreq-12.txt, and Ed P. Eronen, "Diameter Extensible Authentication Protocol (EAP) Application" draft-ietf-AAA-eap-02.txt. This is normally a default AAA server, which may be either the AAA server of the UMTS/WLAN operator or an AAA server of the WLAN network operator (if these operators are not one and the same). In the latter case, the AAA server in the WLAN network forwards the NAI to the AAA server in the subscriber's home UMTS/WLAN network via RADIUS or Diameter. The home AAA server processes the received message and performs an authentication procedure towards the mobile terminal. Subsequent AAA messages (e.g., for accounting during the session) follow the same path between the AAA client and the home AAA server, possibly via an AAA server in the WLAN network.

If a UMTS/WLAN subscriber roams into a WLAN network that has no association with the home network of the subscriber, then the subscriber is granted access only if the visited WLAN network has an association with a UMTS network that has a roaming agreement with the roaming subscriber's home UMTS network. This association may be a direct association or an indirect association via an AAA broker or proxy.

The case where the AAA communication between the visited WLAN access network and the home network of the subscriber must go through a visited UMTS network, (i.e., the UMTS network with which the home UMTS network of the subscriber has a roaming agreement), is illustrated in FIG. 2. More specifically, AAA messages sent from the AAA client to the AAA server of the visited WLAN network are then routed via the AAA server of an intermediary visited UMTS network (30 or 34) to the AAA server 24 of the subscriber's home UMTS network 14. AAA messages in the other direction follow the same path in the opposite direction.

A problem with this arrangement is that the AAA server 20 of the visited WLAN network 12 may have associations with multiple UMTS networks. Thus, the WLAN AAA server 20 does not know which of its associated UMTS networks has a roaming agreement with the home UMTS network 14 of the roaming subscriber. Even if the AAA server 20 of the visited WLAN network 12 did have this knowledge, the home UMTS network 14 of the subscriber may well have roaming agreements with more than one of the UMTS networks associated with the visited WLAN network 12. Because the choice of intermediary visited UMTS network is either impossible or arbitrary for the AAA server 20 of the visited WLAN network 12, the home service network 14 and/or the subscriber should be able to make the choice so that the most appropriate intermediary visited service network is selected. For example, in FIG. 2, intermediary service network 1 may be selected as the intermediary visited network, but intermediary service network 2 may be a better choice or simply the intermediary service network the subscriber prefers. In any event, intermediary service network 3 would not be chosen because the home service network 14 does not have a roaming agreement with it.

There are several approaches to this problem. For two approaches, the WLAN network provides the mobile terminal with information about the service networks associated with the WLAN network. The mobile terminal then selects one of the associated service networks as its intermediary visited service network and indicates the selected network through information incorporated in an "extended NAI" or a "decorated NAI." The format of the decorated NAI could be, for example, home-realm/name@intermediary-visited-network-realm or home-realm!name@intermediary-visited-network-realm. The AAA server of the intermediary visited service network would interpret the decorated NAI, delete the intermediary-visited-network-realm part and move the home-realm part to its normal position after the @ character and delete the slash character or exclamation mark (thus turning the decorated NAI into a regular NAI) before forwarding the AAA message (in which the decorated NAI was included) to the AAA server of the subscriber's home network. Alternatively, the AAA server of the visited WLAN network could perform this operation before sending the AAA message to the AAA server of the intermediary visited service network.

The difference between these two approaches is how the information about associated networks is conveyed to the terminal, and to a certain extent, how the decorated NAI is transferred to the AAA server of the visited WLAN network. In the first approach, the Service Set Identifier (SSID) normally broadcast or "advertised" by the WLAN APs could be modified to contain information about associated UMTS network(s). The mobile terminal could then choose to access the WLAN access network or not, and if it chooses to access the WLAN access network, the mobile terminal can supply network selection information in the decorated NAI in the EAP-Identity Response message (responding to the initial EAP-Identity Request message from the WLAN network) during the authentication procedure.

But because the size of the SSID is limited, (no more than 30 octets of data), this approach relies on the concept of virtual APs to be implemented. With the virtual AP concept, a single physical AP can implement multiple virtual APs so that several WLAN hotspot providers can share the same infrastructure. In the context of network advertising, each associated UMTS network would be represented by its own virtual AP. Each virtual AP would send its own beacon frames advertising a unique SSID that identifies the corresponding UMTS network.

In the second approach, the information about associated UMTS networks could be included in an EAP-Identity Request message, (the EAP Identity Request message format is described in L. Blunk, et al., "PPP Extensible Authentication Protocol (EAP)," RFC 2284), from the WLAN network to the terminal. Specifically, the intermediary network information could be included after a NULL character in the Type-Data field in the EAP-Identity Request message. The EAP-Identity Request message may originate from the WLAN AP (in case it is the initial EAP-Identity Request message) or the AAA server of the visited WLAN network (in case it is a subsequent EAP-Identity Request message). In the former case, the AP includes this information in the initial EAP-Identity Request message provided that the AP, and not the access router, is the EAP authenticator. In the latter case, the AAA server of the visited WLAN network sends the information about associated UMTS networks to the terminal in a second EAP-Identity Request message only if the NAI received from the user/terminal in the response to the initial EAP-Identity Request message is not enough to route the AAA request to the home AAA server of the user. The mobile terminal could also explicitly request the AAA server of the visited WLAN network to send the network information in a second EAP-Identity Request message by providing a NAI with a dedicated request string (e.g., "Network-Info-Requested") in the name portion of the NAI in the first EAP-Identity Response message.

These approaches are terminal-based network selection methods in that the selection of the intermediary visited service network is based on criteria available in the terminal and/or manually input from the user. Available data that can be used for this purpose (besides manual user input) include, e.g., the following USIM files: User controlled PLMN selector with Access Technology (USIM file: $EF_{PLMNwAcT}$), which is a user defined PLMN priority list, Operator controlled PLMN selector with Access Technology (USIM file: $EF_{OPLMNwACT}$), which is an operator defined PLMN priority list, and the Forbidden PLMNs (USIM file: $EF_{FPLMN}$), which is a list of forbidden PLMNs in which roaming is not allowed (see 3 GPP TS 31.102 v6.2.0, "$3^{rd}$ Generation Partnership Project; Technical Specification Group Terminals; Characteristics of the USIM application (Release 6)".

A problem with the first approach, as identified earlier, is the limited space in the SSID field, which makes it necessary to use the virtual AP concept. Using the virtual AP concept for this purpose is problematic for several reasons. The fact that each virtual AP sends its own beacon frame increases signaling overhead (in terms of resources consumed by beacons) and has substantial scaling problems. Even a few virtual APs produce beacons that consume on the order of 10% of the total AP capacity. If numerous UMTS networks, e.g., UMTS networks associated with the WLAN network via a roaming consortium, were advertised, the beacons would consume the entire AP capacity. In addition, most deployed APs do not implement the virtual AP concept, and its presence in future APs is still uncertain. Thus, numerous installed APs would have to be upgraded. Another problem is that many deployed WLAN access networks may not be in a position to change their SSID.

The second approach is also problematic. In the variant where the network information is sent in the first EAP-Identity Request message, the behavior of the APs must be modified (which is particularly undesirable considering the number of deployed APs). In the other variant, a roundtrip delay between the terminal and the AAA server in the visited WLAN network is added to the overall access delay. In addition, since some EAP implementations already use the space beyond a NULL character in the Type-Data field of the EAP-Identity Request to convey various options, there is a potential risk for interference between intermediary UMTS network information transfer and existing use of the data space.

A general problem with all of these approaches is that they require the WLAN network to be knowledgeable about all the potential intermediary UMTS networks. This may not always be the case or even possible, e.g., when there is a roaming consortium between the WLAN network and one or several of the potential intermediary UMTS networks. Thus, schemes relying on network information advertised by the WLAN network may fail in some situations. An additional problem with these approaches is that they require EAPOL to be supported in the WLAN access network, which excludes, e.g., WLAN access networks that use web-based log-in procedures.

Terminal-assisted network selection may also be constrained by limited and possibly outdated input data. For instance, as roaming agreements are established, changed, and even cancelled, an operator-defined PLMN priority list stored in a USIM file may become outdated. Likewise, the mobile terminal or the user may not have the latest information on charging rates and available services for the available PLMNs, which may be prime criteria for PLMN prioritization. If the network selection could instead be based on fresh data from the home network, a better choice of intermediary UMTS network could be made.

Ultimately, if the local access WLAN is not associated with any intermediary UMTS networks included in an operator-defined or a user-defined priority list, the mobile terminal either must assume that roaming is not possible or must select an intermediary UMTS network at random. If the mobile terminal assumes that roaming is not possible, this may be an unnecessary relinquishment of service, because intermediary UMTS networks not listed in the priority lists in the USIM files that have roaming agreements with the home network may still be available. On the other hand, if the user or mobile terminal selects an intermediary network at random, and access through the randomly selected intermediary network is rejected, the user/terminal has to select another intermediary network until access is successful or there are no more intermediary networks to select.

Recognizing these various problems and drawbacks, the inventor determined that if the intermediary network selection was based on fresh data from the home network, an intermediary network not listed in the USIM files (e.g., because of a new roaming agreement) could be selected. As a result, useless access attempts through networks without roaming agreements could be avoided.

Home network-assisted selection of an intermediary service network for a roaming mobile subscriber overcomes these various problems and drawbacks. The selection is based on a list of desired intermediary service networks generated using information from the mobile's own home service network. The list is provided to a central access server which collects information regarding roaming agreements and visited PLMN priority lists from both local access operators and PLMN operators. This home service network-based information regarding intermediary service networks may be collected using real-time operations, non-real-time operations, semi-automatically, and/or manually.

To select an intermediary service network, the visited local access network sends a request for access which includes the user's identifier, e.g., an NAI. The term "request for access" or "access request" is to be broadly understood and includes a request for one or more communications services, a request to connect to the local network, a request for authentication, a request for an IP address, etc. The term "mobile terminal" encompasses mobile terminal equipment, the user or subscriber of the mobile terminal, and the identity of a personal entity such as a SIM-card. So for example, authorization or authentication of the mobile terminal includes authorization or authentication of the user identity and authorization or authentication of the mobile terminal. The term "service network" encompasses any type of entity that can serve subscribers or facilitate serving of subscribers by participating in authentication, authorization and/or accounting signaling, e.g., a network serving its subscribers, an intermediary network, or a roaming consortium, e.g., in the form of a AAA server.

The local access network sends the request for access to a central access or AAA server, which returns a list of intermediary service networks. The local access network selects one of the listed intermediary service networks to be used in an authentication procedure between the mobile terminal and the home service network. The intermediary service networks are preferably listed by priority to permit the local access network to select the highest priority intermediary service network with which it has an association.

In one, non-limiting, example implementation, the home service network is a public land mobile radio network (PLMN) that includes a PLMN access server and a memory that stores a list of intermediary PLMNs with which the home PLMN is associated. There are multiple intermediary PLMNs in the system, and at least one is included on the list. The intermediary PLMNs may be identified on the list using a domain name or a fully-qualified domain name of an authentication server of the intermediary PLMN. The term "fully-qualified domain name" (FQDN) as used herein encompasses host names, identifying individual hosts/nodes, as well as domain names of the Domain Name System (DNS) in general. A wireless local area network (WLAN) includes a WLAN access server for receiving an access request message from the mobile terminal that requires authentication with the home PLMN. In response, WLAN access server forwards the access request message to a central access server. The central access server obtains the list of intermediary service networks with which the home PLMN is associated and provides that list to the WLAN access server. The WLAN access server selects from the provided list an intermediary PLMN to be used in authenticating the mobile terminal's access to the home PLMN and forwards the access request message to the selected intermediary PLMN. The selected intermediary PLMN conveys the access request message towards the home PLMN either directly or via one or more other intermediary access servers, e.g., an AAA server.

In another, non-limiting, example implementation, the PLMNs are universal mobile telecommunications system (UMTS) networks and the authentication server, the central access server, the WLAN access server, and the home UMTS network access server are authentication, authorization, and/or accounting (AAA) servers. Although any AAA protocol may be used, in a preferred, but still example detailed implementation, the central AAA server may be a Diameter redirect agent used by the WLAN access server to route an AAA request message concerning the mobile terminal which is not routable by the WLAN AAA server. Domain names of the listed intermediary UMTS networks are included by the Diameter redirect agent in Redirect-Host attribute value pairs (AVPs) in a Diameter answer message. The AAA request message includes a name part and a realm part with the realm part, having a specific ending used by the WLAN AAA server to send the AAA request message to the redirect agent. The WLAN AAA server selects an intermediary UMTS network from the list and forwards the AAA request message to the selected intermediary UMTS network, which recognizes the realm part and forwards the AAA request message to the home UMTS network. Subsequent Diameter messages are conveyed between the mobile terminal and the home UMTS network by the WLAN AAA server and the selected UMTS network AAA server.

In another example implementation, the central access server may also be a RADIUS proxy server or relay agent. The WLAN access server may select an intermediary PLMN using the home PLMN based list in combination with another scheme for selecting an intermediary PLMN. An example of another such scheme is the commonly-assigned application entitled, "Terminal-Assisted Selection of Intermediary Network For A Roaming Mobile Terminal," cross-referenced above.

DETAILED DESCRIPTION

The following description sets forth specific details, such as particular embodiments, procedures, techniques, etc., for purposes of explanation and not limitation. It will be appreciated by one skilled in the art that other embodiments may be employed apart from these specific details. For example, although the following description is facilitated using non-limiting WLAN/UMTS examples, the present invention may be employed in any local access/PLMN networks. In some instances, detailed descriptions of well-known methods, interfaces, circuits, and signaling are omitted so as not to obscure the description with unnecessary details. Moreover, individual blocks are shown in the figures. Those skilled in the art will appreciate that the functions of those blocks may be implemented using individual hardware circuits, using software programs and data, in conjunction with a suitably programmed digital microprocessor or general purpose computer using application specific integrated circuitry (ASIC), and/or using one or more digital signal processors (DSPs).

Figure 1:
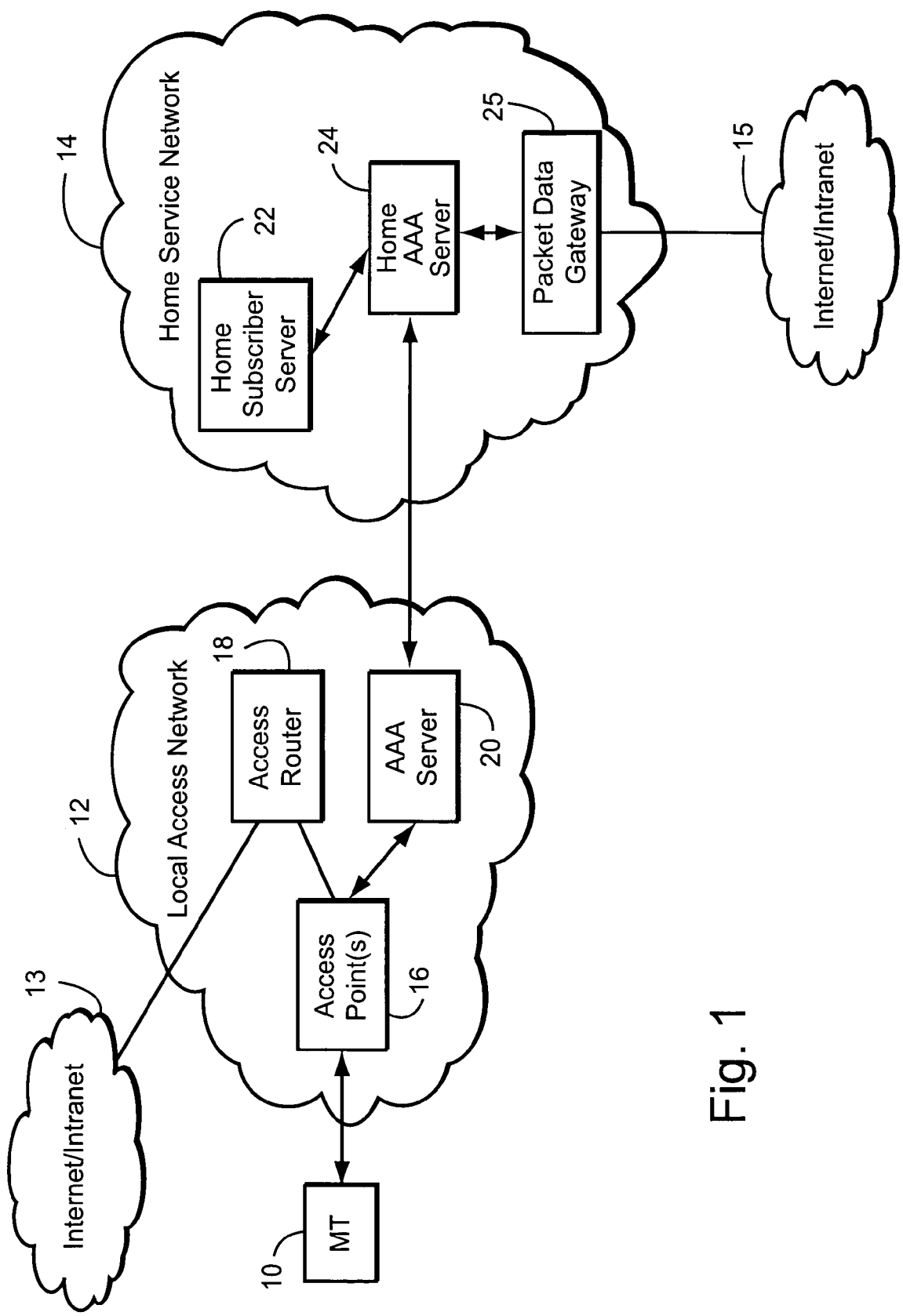
FIG. 1 is a diagram illustrating a system in which packet data services provided by a home service network can be accessed via a local access network.
Figure 2:
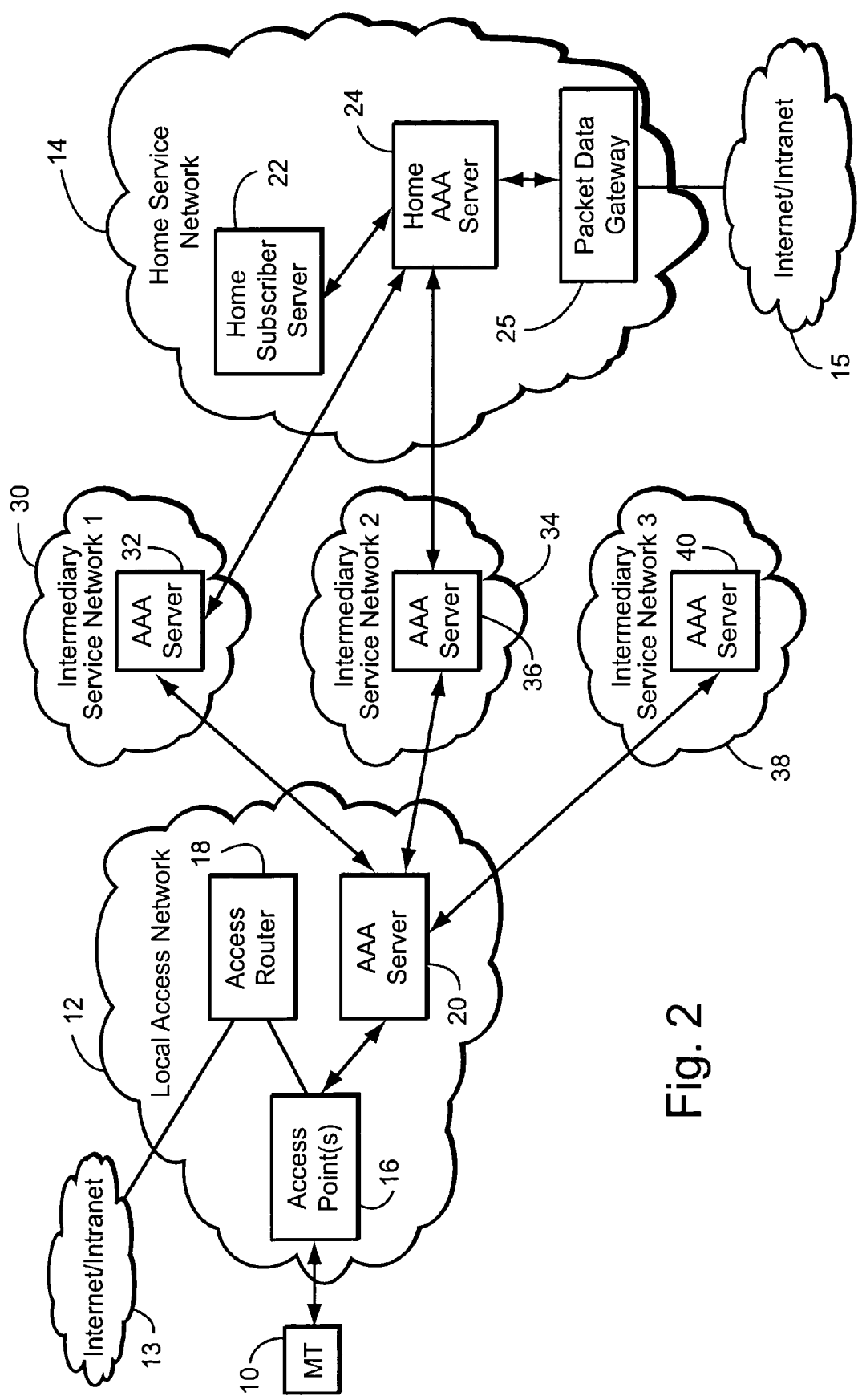
FIG. 2 illustrates indirect access to the home service network via the local access network and an intermediary service network.
Figure 3:
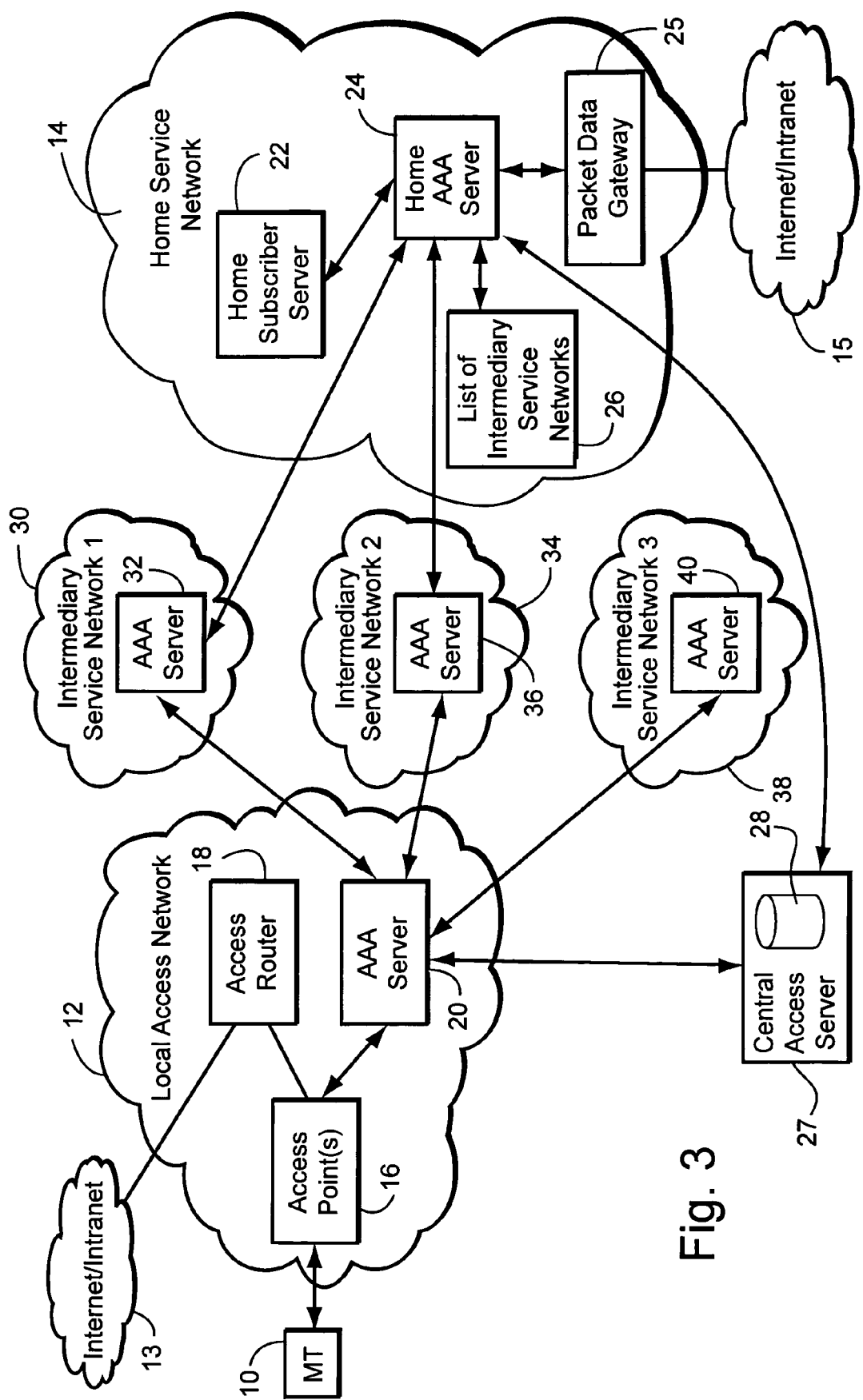
FIG. 3 illustrates indirect access to the home service network via the local access network and an intermediary service network using a central access server that stores a list of intermediate service networks provided by the home service network

FIG. 3 illustrates a system that may be used to provide a roaming mobile terminal 10 the ability to be authenticated and/or authorized by its home service network 14 so it can receive communications services if desired. FIG. 3 is similar to FIG. 2 described above with the addition of a central access server referred to in this example as a central AAA server 28 that is coupled to the AAA server 20 of the local access network 12 and to a list server 27 of the home service network 14. The home service network 14 also includes a list of intermediary service networks 26, which may be stored directly on the list server 27, or is otherwise accessible to the list server 27. The list of intermediary service networks includes only those networks with which the home network has a roaming agreement or similar associations and are preferably (but not necessarily) prioritized in the list. In the example of FIG. 3, intermediary service network 3 would not be listed, and intermediary service networks 1 and 2 would be listed.

When the AAA server 20 in the local access network 12 receives an access request message from the mobile terminal 10 that requires authentication with its home service network and the local access network 12 does not recognize the home service network, the AAA server 20 forwards the access request message to the central AAA server 28. The central AAA server 28 determines the identity of the home service network 14 and obtains a list of intermediary service networks 26 generated or provided by the home service network 14 with which the home service network has an AAA association, e.g., a roaming agreement. The central AAA server 28 may collect such lists from various home service networks and regularly update them, or the central AAA server 28 may retrieve the appropriate list from the home service network or elsewhere when requested by a local access network AAA server. For example, the list may be retrieved from a database located at the same site as the central AAA server 28. Thus, although the list 26 is shown separately in the home service network 14 and associated with a separate list server 27, it may also be stored in a database 29 associated with the central AAA server 28, if desired. Other list storage and/or maintenance configurations are also possible. The list 26 may be operated or obtained through real time operations, semi-manual operations, or manual off-line operations. While generating or obtaining the list may involve one or more different entities, the main point is that the list provided to the central AAA server 28 include those intermediary service networks with which the home service network 14 has a current roaming association. Preferably, the list is also prioritized according to the current order of preference of the operator of the home service network. This order of preference may change more or less frequently, e.g., as inter-operator charging rates are changed due to charging policy updates or possibly several times per day as charging rates vary with the time of day.

The central AAA server 28 provides the list to the local access network AAA server 20 which selects from that list one of the intermediary service networks with which the local access network is also associated, or at least knows how to route the access request (i.e., for which intermediary service network the local access network AAA server knows the next hop in the AAA route). The mobile access request message is forwarded by the local access network AAA server 20 to the selected intermediary service network AAA server which forwards that message onto the home AAA server 24. In the example shown in FIG. 3, either intermediary service networks 1 or 2 may be selected by the local access network AAA server 20.

Figure 4:
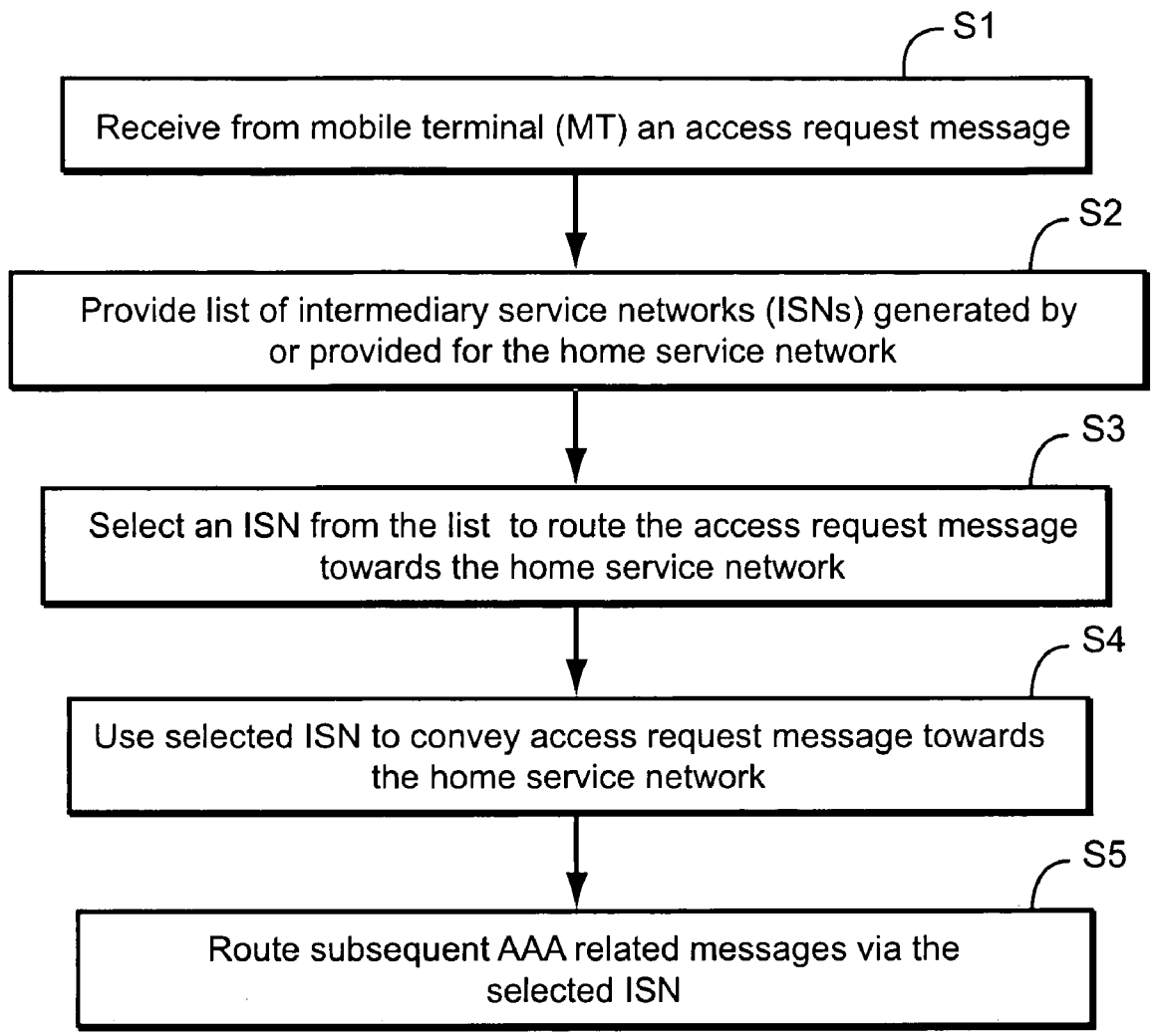
FIG. 4 is a flowchart illustrating example procedures that may be performed when a roaming mobile terminal requests network access.

Reference is now made to the flowchart diagram in FIG. 4, which outlines basic steps that may be performed in selecting an intermediary service network from a home service network-based list. First, an access request message is received from the mobile terminal (MT) (step S1). A list of intermediary service networks generated or provided by (or for) the home service network is obtained or otherwise provided (step S2). One of the intermediary service networks on the list is selected to route the access request message towards the home service network (step S3). The selected intermediary service network is used to convey the initial access request message towards the home service network (step S4). Subsequent AAA-related messages are routed by way of the selected intermediary service network (step S5). If no list match is found, the access attempt may be rejected or other access methods may be tried, for example as described in commonly-assigned application Ser. No. 10/960,783, entitled, "Enhancement of AAA Routing Originated from a Local Access Network Involving Intermediary Network Preferences."

Figure 5:
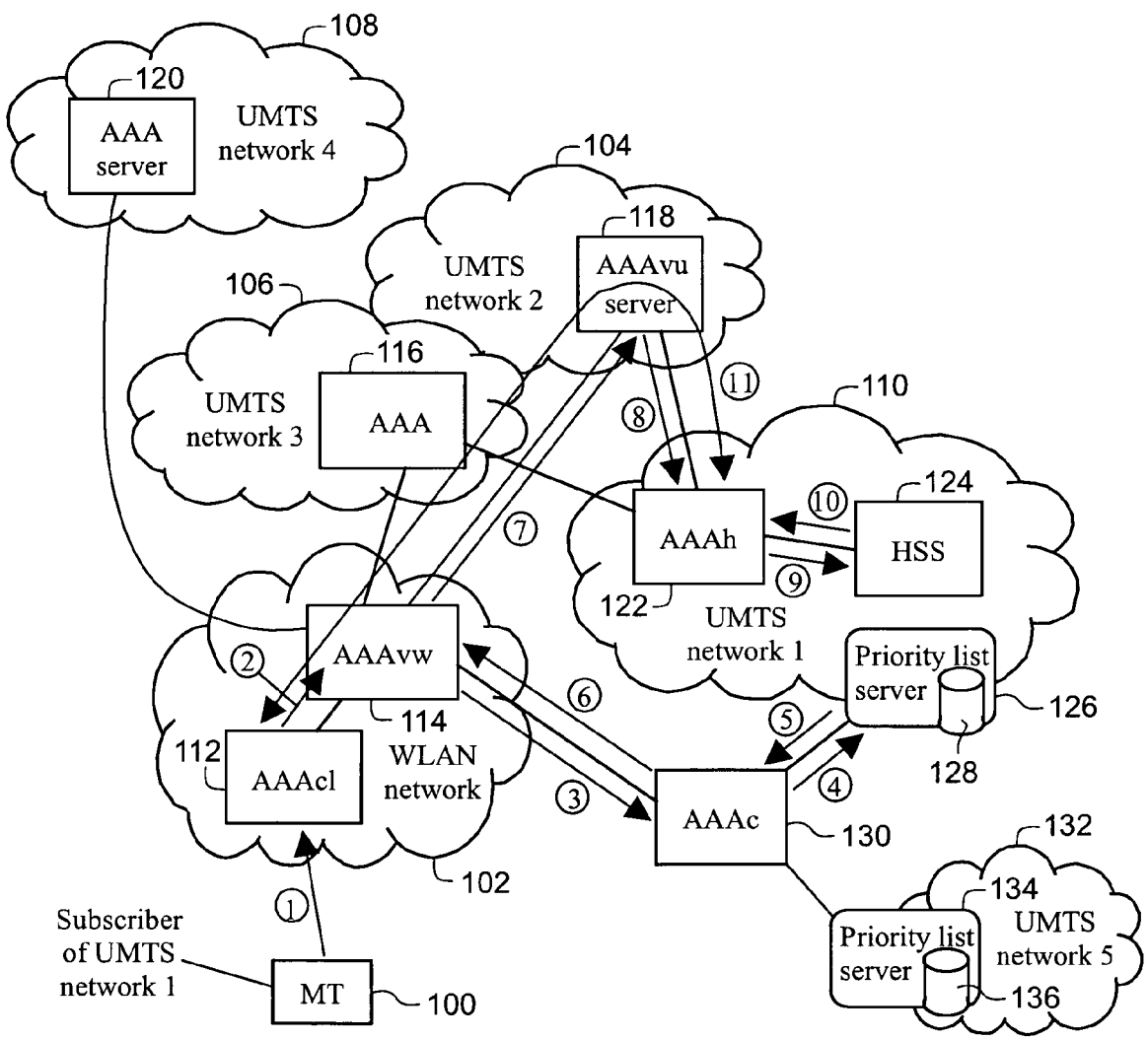
FIG. 5 illustrates a non-limiting example application in which the local access network is a WLAN network, the intermediary and home service networks are UMTS networks, and the central access server is a Diameter re-direct agent.

FIG. 5 illustrates a non-limiting, example application in which the local access network is a WLAN network, the intermediary and home service networks are UMTS networks, and the central access server is a Diameter redirect agent, i.e., an AAA server processing AAA messages according to certain rules. The AAA server 114 of the visited WLAN network 102 (denoted AAAvw) receives from the mobile terminal 100 via the AAA client 112 (denoted AAAcl) an access request message. That message includes an NAI identifying the roaming subscriber. But the AAAvw server 114 does not recognize the realm part of the NAI because, for the purpose of this FIG. 5 example, the WLAN network 102 has no roaming association with the home network 110 of the subscriber, i.e., UMTS network 1. However, even if the AAAvw server 114 does have a roaming association with one or more UMTS networks that could act as an intermediary visited UMTS network and forward the AAA messages to the subscriber's home network 110, the assumption is that the AAAvw 114 is not aware of how to route AAA messages via such intermediary visited UMTS networks to the home network, i.e., the AAAvw server 114 is not aware of which UMTS networks can act as an intermediary visited UMTS network for roaming subscribers of UMTS network 1.

In this example implementation, all UMTS network subscribers employ a scheme where a realm part of the NAI has a specific ending, e.g., "3gppnetwork.org" or "GSM-association.org" (henceforth generically and without limitation referred to as "specific-ending.org"). With this specific NAI realm-part ending, the central AAA server 130 (denoted AAAc) can redirect access requests destined for conforming networks. The central AAAc server 130 in this example is a Diameter redirect agent and may be managed by, e.g., the GSM Association, the UMTS Forum, 3GPP, or some other joint venture or non-profit organization established by network operators.

For AAA messages that would otherwise be non-routable AAA messages by the WLAN 102, the AAAvw server 114 includes an entry for "specific-ending.org" in its realm-based routing table including the fully-qualified domain name (FQDN) of the AAAc 130. The AAAvw server 114 preferably also establishes a shared secret key, or other type of secret data, e.g., a password, defined with the AAAc redirect agent 130 to help establish security associations to protect the AAA communication with the AAAc server 130.

When an AAA message with a NAI with an unrecognized realm part that ends with "specific-ending.org" is received, the AAAvw server 114 sends that message to the central access AAA server indicated in the realm-based routing table entry for "specific-ending.org", i.e., the redirect agent AAAc server 130. When the redirect agent AAAc server 130 receives the AAA message from the AAAvw server 114, it returns a (preferably prioritized) list of fully-qualified domain names (FQDNs) of the intermediary AAA servers of UMTS networks with which the subscriber's home network has a roaming agreement. If the answer message from the AAAc server 130 contains no AAA server that the AAAvw server 114 has a roaming association with, the AAAvw server 114 sends an AAA message to the AAA client 112 with the Result-Code AVP set to DIAMETER_UNABLE_TO_DELIVER. In this case, the AAAvw server 114 creates no dynamic entries in its realm-based routing table and the peer table. Alternatively, the AAAvw server 114 may attempt to use alternative AAA routing mechanisms, e.g. as described in commonly-assigned application Ser. No. 10/960,783, entitled, "Enhancement of AAA Routing Originated from a Local Access Network Involving Intermediate Network Preferences."

A peer table is a table of all the AAA server's peer AAA servers. The peer AAA servers of AAA server X are the AAA servers with which AAA server X can communicate directly. The peer table contains the FQDNs of these peer AAA servers as well as some data associated with the peer AAA server (or with the table entry itself) such as its status and certain security related data. A peer table entry may be static or dynamic, i.e., with a certain expiration time. A routing table is based on the realm part of a NAI and returns the FQDN of an AAA server that represents the next hop in the AAA route towards the destination (the next hop may also be the destination itself). Alternatively, the route entry for a certain realm may indicate that the AAA message should be handled locally in the AAA server without being forwarded. An AAA server indicated in the routing table as the next hop for a certain realm must also be present in the peer table.

The redirect agent AAAc 130 may include the FQDNs in Redirect-Host Attribute Value Pairs (AVPs) in its answer message to AAAvw server 114. This answer message may follow the regular format of an answer message from a Diameter redirect agent. That is, the 'E'-bit is set (indicating redirection) in the Diameter message header, and a Result-Code AVP set to DIAMETER_REDIRECT_INDICATION is included. A Redirect-Host-Usage AVP and a Redirect-Max-Cache-Time AVP may also be included.

The Redirect-Host-Usage AVP may be set to ALL_REALM or REALM_AND_APPLICATION or ALL_SESSION, and the Redirect-Max-Cache-Time AVP may be set to the recommended lifetime of the AAA server priority list represented by the Redirect-Host AVPs. To be more precise, a Redirect-Host AVP contains more than a FQDN. It contains a Uniform Resource Identifier (URI), whose syntax rules allow either of the following two general formats:

"aaa://" FQDN [port] [transport] [protocol]
"aaas://" FQDN [port] [transport] [protocol]

The former format is used when no transport security is used, otherwise the latter format is used. The "[ . . . ]" notation around a field indicates that the field is optional. "Port" refers to a transport layer protocol port. "Transport" refers to a transport layer protocol. "Protocol" refers to an AAA protocol.

When the WLAN AAAvw server 114 receives the answer message from the redirect agent AAAc 130, it selects one of the listed intermediary AAA servers indicated by the FQDNs in the Redirect-Host AVPs. In the example of FIG. 5, UMTS networks 2 and 3 are included in the list and are labeled with reference numerals 104 and 106. Each has a corresponding AAA server 118 and 116, respectively. Although UMTS network 4, labeled with reference number 108 and including AAA server 120, has a roaming agreement the WLAN network 102, the UMTS network 4 is not included on the intermediary UMTS network list because it does not have a roaming association with the home UMTS network 1 of the mobile terminal 100. The AAAvw server 114 preferably (but not necessarily) searches the Redirect-Host AVPs in the order in which they appear in the received answer message, assuming the order reflects highest-to-lowest priority. The first AVP that matches an AAA server of an intermediary network with which the AAAvw server 114 has a roaming association is selected. Presumably, the matched intermediary network AAA server is the same as the first one that matches the host identity in any of the entries in the peer table of the AAAvw 114. The AAAvw server 114 forwards the original AAA access request message with the NAI to the selected intermediary AAA server, which is designated the AAAvu server. In this example, UMTS network 2 is selected presumably because it has a higher priority than UMTS network 3. Accordingly, the AAAvu server 118 is selected.

It would also be possible for the AAAvw server 114 to construct a "decorated NAI" or "extended NAI" using the information in the received list of FQDNs, e.g., if the selected intermediate UMTS network is reached via a roaming consortium (not shown in FIG. 5). A roaming consortium might include a group of UMTS networks and/or other networks which permit mobile subscribers of each member network to roam in member network coverage areas. Thus, rather than establishing a bilateral roaming agreement between the two UMTS networks, a roaming consortium produces the same roaming capability but with multiple networks. For purposes of this description, a roaming agreement or association covers specific agreements between individual UMTS networks or between an individual UMTS network and a roaming consortium. And although one intermediary network is selected from the list, the AAA path may include one or more other intermediary network(s)/AAA server(s) in addition to the selected intermediary UMTS network, e.g., in the form of a roaming consortium.

The AAAvu server 118 receives the access request message forwarded by the AAAvw 114. Because the AAAvu 118 has a roaming agreement with the subscriber's home UMTS network 110, it recognizes the realm part of the subscriber's NAI and forwards the message to the home AAA server 122 (denoted AAAh). The home UMTS network 1 includes a priority list server 126 and a database 128 or other memory that stores a prioritized list of intermediary UMTS networks with which the home UMTS network has a roaming agreement. The redirect agent AAAc server 130 is coupled to the priority list server 126. Some other entity may provide that priority list to the AAAc server 130, if desired. One or more additional UMTS networks may also be coupled to the AAAc server 130. For example, UMTS network 5, labeled as 132, is coupled to the AAAc server 130, and includes a priority list server 134 and a database 136 for storing the prioritized list for UMTS network 5.

The AAAvw server 114 may also create a dynamic entry in its realm-based routing table for the realm part of the subscriber's NAI and a corresponding dynamic entry for the FQDN of the selected AAAvu server 118 in the AAAvw server's peer table. The expiration time for both these dynamic entries may be set according to the contents of the Redirect-Max-Cache-Time AVP in the message received from the AAAc server 130. Because of the new dynamic entries, subsequent AAA messages follow the server path AAAcl⇆AAAvw⇆AAAvu⇆AAAh in both directions.

The AAAc server 130 may return a prioritized list of the FQDNs of the AAA servers of all the intermediary UMTS networks with which the subscriber's home network has a roaming agreement in a variety of ways. One way is to have a realm-based routing entry with the Local Action indication set to REDIRECT for the realms of all its affiliated networks. For a regular Diameter redirect agent, a realm-based routing entry with a REDIRECT indication may also include the FQDNs of all the AAA servers that the concerned AAA message could be redirected to, i.e., the complete list of prioritized FQDNs in this case.

The list of FQDNs in the realm-based route entry for, e.g., "popular-umts-wlan-operator.specific-ending.org," could be manually entered through a configuration interface or semi-manually entered via a program script. The concerned operator (e.g., popular-UMTS-WLAN-operator) may also create and update the entry remotely via, e.g., file transfer protocol (FTP) or through a web interface using HTTP or S-HTTP. This way the priority lists could be updated in the realm-based route entries as soon as there is any change. A priority list may be changed, e.g., because of new, changed, or annulled roaming agreements or because of changed charging rates. If the charging rates are time-of-day dependent, they may be automatically changed at certain times every day by a program script.

The AAAc server is particularly beneficial and flexible if real-time data is used rather than manually or semi-manually maintained realm-based route entries. Real-time list update may be achieved, for example, by using dynamically-created, real-time route entries. Using such entries, a realm-based route entry access triggers a request for a priority list. The request is sent to a server at the same site as the AAAc server 130 or at a remote site controlled by the concerned operator. If a server on the AAAc site is used, each operator would still be in control of its own data on the server. The server would return an existing priority list or create one in real-time. In the former case, the priority list may still have a very dynamic nature. It could, e.g., be changed at certain times during the day to adapt to time-of-day dependent charging rates. But priority lists created in real-time provides the greatest flexibility. Real-time lists may be time-of-day dependent, but if the NAI is transferred in the request, it is also possible to customize the priority list for each subscriber, e.g., depending on the subscriber's charging plan or service profile.

Some example protocols that may be used by the AAAc server to retrieve the real-time priority list retrieval include, e.g., HTTP/S-HTTP, (and the priority list could be created by an ASP script or some other software), FTP, and Diameter. If Diameter is used, a dedicated Diameter server at the site of the operator could handle the requests. It would have a realm-based route entry for the realm of the operator with the Local Action indicator indicating REDIRECT. This realm-based route entry triggers the creation of a priority list that would be returned to the AAAc server. In such a Diameter arrangement, the Diameter AAAc server would not act as an orthodox Diameter redirect agent, since it actually forwards the AAA message to another Diameter redirect agent which then forwards the reply. In this regard, the central access server is more of a proxy or relay agent rather than a redirect agent.

With customized real-time created priority lists, it is also possible to let the subscriber specify his/her own criteria that can be used together with common criteria for how to create the priority list. A subscriber may choose whether low charging rates or availability of a certain service or some other condition should be the most important criterion for creating of the priority list. The subscriber may specify and edit his/her criteria through off-line channels, (e.g. via phone to the operator's customer service center), or via on-line access, (e.g., through a password-protected web interface).

A retrieved real-time priority list may be associated with a limited lifetime and cached in the AAAc server 130. This way the AAAc server 130 does not have to retrieve the priority list multiple times when it receives frequent requests concerning the same realm-based route entry during the lifetime of the priority list. A "lifetime" may also be associated with a priority list in a realm-based route entry. The AAAc server 130 refreshes the priority list by requesting a new list from the list server when the lifetime expires. This way the priority lists are reasonably fresh, (semi-real-time), but the response time of the AAAc server 130 would be reduced, since it does not have to retrieve the priority lists in real-time.

Figure 6:
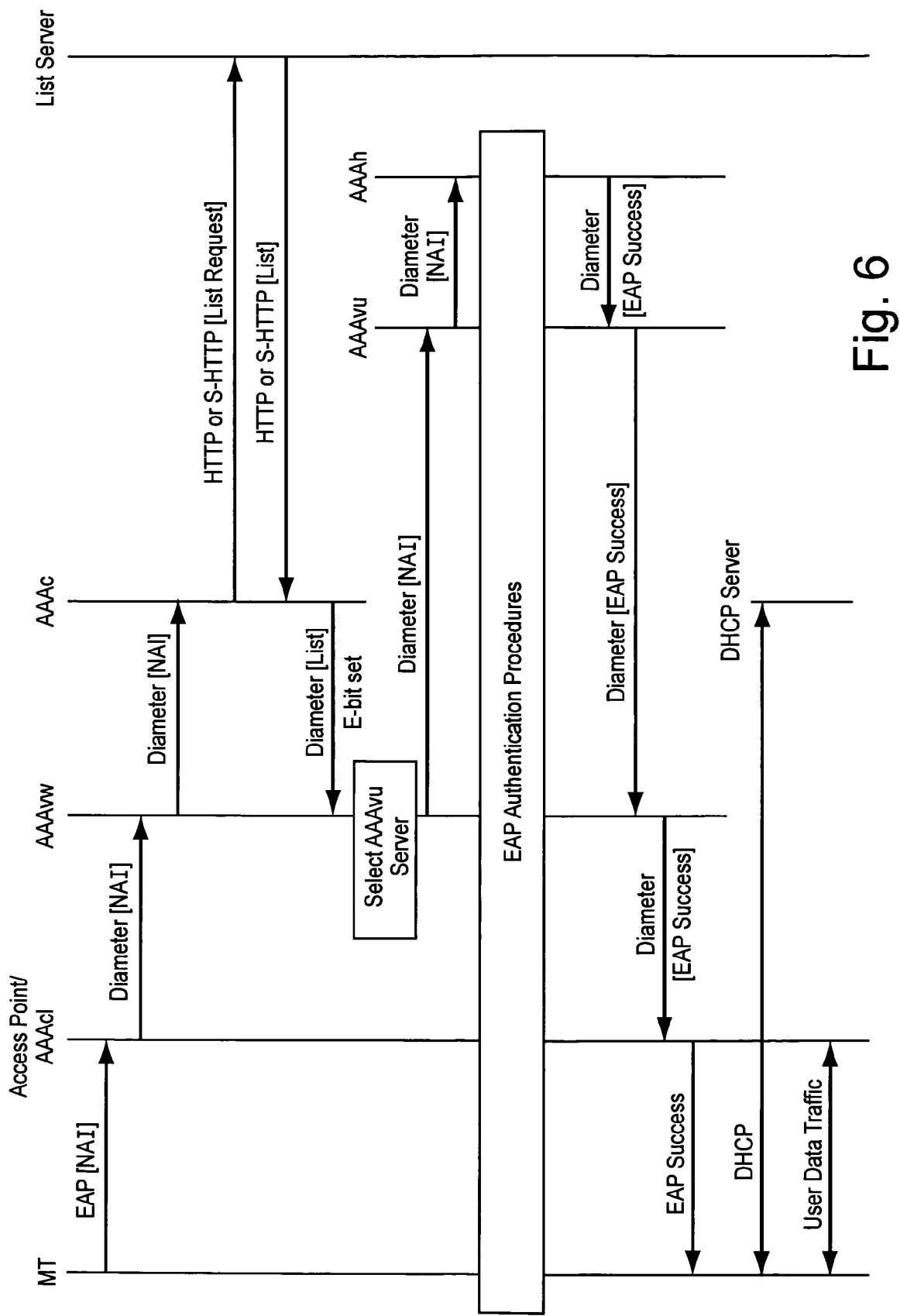
FIG. 6 illustrates non-limiting example protocols and messages between various nodes shown in FIG. 5.

FIG. 6 illustrates a signaling diagram that together with the numbers correlated with the signaling arrows in FIG. 5 specify an example sequence and certain example contents of the messages involved in an access request and the intermediary UMTS network selection. Those steps are as follows:

1. The mobile terminal (MT) sends its NAI to the AAAcl 112 in an EAP message.

2. The AAAcl 112 sends the NAI to the AAAvw server 114 in a Diameter message.

3. The AAAvw server 114, (which has no association with the network indicated in the NAI, i.e., UMTS network 1), forwards the Diameter message to the AAAc 130.

4. The AAAc server 130 requests, e.g., using HTTP or S-HTTP, an AAA server priority list from the list server 126 operated by the operator of the home UMTS network 110.

5. The list server 126 operated by the operator of home UMTS network 1 returns an intermediary AAA server priority list to the AAAc server 130, e.g., using HTTP or S-HTTP.

6. The AAAc server 130 sends the AAA server priority list to the AAAvw 114 server in a Diameter message with the 'E'-bit set (indicating redirection).

7. The AAAvw server 114 selects an AAAvu server from the AAA server priority list and forwards the original Diameter access message to the selected intermediary AAAvu server 118.

8. The intermediary AAAvu server 118 (which has a roaming agreement with UMTS network 1) forwards the Diameter message to the AAAh server 122.

9. If EAP AKA (or EAP SIM) is used, the AAAh server 122 may request authentication vectors from the HSS 124 using a Mobile Application Part (MAP) message (unless it already has authentication vectors for the concerned subscriber). This is not indicated in FIG. 6, but precedes the part that is indicated as "EAP Authentication Procedures."

10. If message 9 was sent, the HSS 124 returns authentication vectors to the AAAh server 122 using a MAP message.

11. Subsequent Diameter messages follow the path AAAcl⇌AAAvw⇌AAAvu⇌AAAh in both directions. Thereafter, the well-known dynamic host configuration protocol (DHCP) is used to enable the mobile terminal to obtain its IP address and other configuration information before user data traffic communication commences.

If many operators use this scheme, and if UMTS/WLAN users grow to great numbers, the AAAc server 130 may be heavily loaded. In that situation, it is favorable that the AAAc server 130, being a Diameter redirect agent in this example, is a "lightweight" application as compared to a typical Diameter server, because a Diameter redirect agent does not process the actual message context and only has to redirect the first message of session. During the rest of the session, (and possibly also some subsequent sessions), the messages are simply routed without involvement from the redirect agent. Furthermore, a Diameter redirect agent is state-less and does not store user session information or transaction information, (i.e., a transaction corresponds to a single request-response message exchange). Therefore, it is easy to implement the AAAc 130 as a distributed server with load sharing for increased scalability.

If implemented for RADIUS, the AAAc server 130 may be a RADIUS proxy server or relay agent, since the redirect agent concept does not exist in RADIUS. A possible advantage or drawback (depending on the application) of the proxy server approach is that a proxy generally actively processes every message between the AAAvw server 114 and the AAAvu server 118.

This home network-assisted scheme for selection of intermediary service network can be used in combination with other selection schemes such as the terminal-assisted scheme described in the co-pending, commonly-assigned application noted above. When the two schemes coexist, one preferred approach is for the WLAN server to use the network priority list from the mobile terminal, if the mobile terminal provides one. The WLAN server uses the home network-assisted scheme (and routes the AAA message to the AAAc server) only if the mobile terminal does not provide any network preference information or if the network priority list from the mobile terminal does not include any network that has an association with the visited WLAN network.

In an alternative example embodiment, the intermediary network information originating from the home service network (or otherwise created by the operator of the home service network) includes information that can be used to select more than one intermediary service network in the path between the local access network and the home service network. Assume, for example, that the information includes information that enables selection of two intermediary service networks. This information then, as previously described, consists of a number of potential intermediary service networks, which are associated with the home service network of the user of the mobile terminal. For explanatory purposes, these intermediary service networks are referred to as "primary intermediary service networks."In addition, to enable selection of a second intermediary service network for each of the potential primary intermediary service networks, the information includes a number of potential intermediary service networks that are associated with the potential primary intermediary service network. For explanatory purposes these intermediary service networks are referred to as "secondary intermediary service networks." Thus, in the information supplied by the home service network or the operator of the home service network, the potential intermediary service networks are grouped, and each group contains one potential primary intermediary service network and zero or more potential secondary intermediary service networks that are associated with the potential primary intermediary service network. If the information is transferred from the central server to the local access network in a Diameter message (as previously described), it could be included in Redirect-Host AVPs ordered according to the following example procedures.

The first Redirect-Host AVP contains the most preferable, (e.g., highest priority), potential primary intermediary service network. After that follows zero or more Redirect-Host AVPs containing (in order of preference) the potential secondary intermediary service networks associated with the preceding potential primary intermediary service network. Thus, these Redirect-Host AVPs, i.e., the one containing the potential primary intermediary service network and the ones containing the potential secondary intermediary service networks, represent the first group. To separate this group from the next group, the FQDN in the next Redirect-Host AVP contains a special "delimiter string", e.g., "-". After the "delimiter Redirect-Host AVP" comes the next group consisting of a Redirect-Host AVP containing the potential primary intermediary service network, with the second highest priority and zero or more Redirect-Host AVPs (in order of priority) containing a potential secondary intermediary service network each. Each potential secondary intermediary service network is associated with the second highest priority potential primary intermediary service network. This principle applies to an arbitrary number of groups.

Grouping AVPs can also be generalized so as to allow selection of an arbitrarily long sequence of intermediary service networks. If more than two "levels" (denoted primary and secondary in the example above) of potential intermediary service networks are considered, each potential intermediary secondary service network may (continuing the above AVP grouping principle example) be followed by zero or more potential intermediary service networks associated with the secondary intermediary service network (thereby representing the third level of potential intermediary service networks). The subgroups, each containing a potential secondary intermediary service network and zero or more potential third level intermediary service networks, may be separated by "delimiter Redirect-Host AVPs" containing FQDNs containing, e.g., the string "--" (and for the next level subgroups the "delimiter Redirect-Host AVP" could contain a FQDN that contains the string "---", etc.).

The groups are preferably priority-ordered with regards to the potential primary intermediary service networks. Within each group, the potential secondary intermediary service networks are preferably priority-ordered with regards to the potential secondary intermediary service networks. This principle may be generalized to an arbitrary number of levels of potential intermediary service networks.

In another non-limiting example of "delimiter Redirect-Host AVPs," the special FQDN strings "-", "--", "---", etc. are not used. Instead, the "delimiter Redirect-Host AVP" does not begin with "aaa://" or "aaas://" (as required by the regular Redirect-Host AVP syntax), but with another string indicating that the Redirect-Host AVP is a "delimiter Redirect-Host AVP" as well as what group or subgroup level the "delimiter Redirect-Host AVP" is significant for. Other examples of "delimiter Redirect-Host AVPs" may involve special values of the "port", "transport" and/or "protocol" fields of the Redirect-Host AVPs.

Another non-limiting example of how the information could be included in a Diameter message transferred from the central server to the local access network is to use new AVP types, e.g., one new AVP type for each level of potential intermediary service network. The information may be structured and ordered into groups and subgroups as described above.

Yet another non-limiting example of how the information could be included in a Diameter message transferred from the central server to the local access network is to include it in a single Redirect-Host AVP and format the domain name or fully-qualified domain name contained in the AVP in the manner described in the commonly-assigned application Ser. No. 10/960,780, entitled, "Terminal-Assisted Selection Of Intermediary Network For A Roaming Mobile Terminal."

The local access network, when receiving the information supplied by the home service network (or the operator of the home service network) from the central server, first attempts to find a potential primary intermediary service network with which it has an association (preferably searching the information in order of priority). If none can be found, the local access network attempts to find a potential secondary intermediary service network (preferably searching the information in order of priority), etc. If the local access network, for instance, finds a potential secondary intermediary service network with which it has an association, it selects this as the secondary intermediary service network. By doing this, the local access network implicitly selects as the primary intermediary service network the potential primary intermediary service network belonging to the same group as the selected secondary intermediary service network. The local access network then constructs a decorated NAI including (in addition to the home service network realm) the realms of both the selected secondary intermediary service network and the selected primary intermediary service network. The decorated NAI could, e.g., have the following format: primary-intermediary-network-realm-!home-realm!name@secondary-intermediary-network-realm (or its generalized form: level-m-1-intermediary-network-realm!level-m-2-intermediary-network-realm! . . . !primary-intermediary-network-realm!home-realm!name@level-m-intermediary-network-realm).

When used in routing AAA messages, the decorated NAI of the above format would cause an AAA message to traverse both the selected secondary intermediary service network and the selected primary intermediary service network (in that order) before reaching the home service network. Before forwarding the AAA message, the traversed AAA server in the selected secondary intermediary service network would remove its own realm from the decorated NAI and move the realm of the selected primary intermediary service network from its position at the furthest left in the decorated NAI to its new position to the right of the @ character. The traversed AAA server in the selected secondary intermediary service network would also remove the exclamation mark (which serves as a delimiter character between realms in this example) to the left of the home-realm. The traversed AAA server in the selected primary intermediary service network would rearrange the decorated NAI in a similar way as the traversed AAA server in the selected secondary intermediary service network before forwarding the AAA message. It would remove its own realm from the decorated NAI and move the realm of the home service network from its position at the furthest left in the decorated NAI to its new position to the right of the @ character. The traversed AAA server in the selected primary intermediary service network would also remove the exclamation mark to the left of the name part of the NAI. This final rearrangement turns the decorated into a regular NAI. In the general case, the AAA message would traverse the selected $m^{th}$ level intermediary service network, the selected $(m-1)^{th}$ level intermediary service network, etc. through the selected primary intermediary service network (in that order) before reaching the home service network. Each traversed intermediary AAA server would rearrange the decorated NAI before forwarding the AAA message. It would remove its own realm (which is located to the right of the @ character) from the decorated NAI, move the realm at the furthest left of the decorated NAI to a new position at the right of the @ character, and delete the exclamation mark that was located to the right of the moved realm. When the AAA server of the home service network receives the AAA message, it knows from the absence of exclamation marks to the left of the @ character that the NAI is a regular NAI and that the AAA server itself is the final destination of the AAA message (as indicated by the realm of the home service network to the right of the @ character).

The invention allows the home operator of a roaming mobile subscriber to influence the choice of intermediary visited PLMN network when the subscriber is roaming in a WLAN network that is not associated with the home PLMN of the subscriber. As a result, an intermediary visited PLMN can be selected and AAA type messages can be routed to the home network, even if the mobile terminal lacks the necessary data for network selection. The home operator can supply static, semi-static, or highly dynamic AAA server priority lists. The priority lists can be created or updated in real-time and can be customized on a per subscriber basis. Even though the home operator supplies the AAA server priority list on which to base the choice of intermediary visited UMTS network, it is still possible to let the subscriber influence the priority list. The inventive solution does not manipulate the format of the NAI, and thus, avoids potential realm-based routing problems. No dedicated software is required in the mobile terminal, the AAA client, the AAAvw server, the AAAvu server, or the AAAh server. Regular Diameter mechanisms can be employed, and EAP is not "polluted" with non-authentication related data. Furthermore, the potential interference problem with other use of the space beyond the NULL character in the Type-Data field of the EAP-Identity Request message is avoided. Existing protocols may be used without modifications, and the scheme works also with non-EAP based authentication methods, provided that the home AAA server accepts authentication methods other than EAP AKA and EAP SIM. The scheme does not rely on network information advertised by the WLAN network, and hence, works even if the WLAN network is not aware of, and thus cannot advertise, all potential intermediate networks.

Although various example embodiments have been shown and described in detail, the claims are not limited to any particular embodiment or example. None of the above description should be read as implying that any particular element step, range, or function is essential such that it must be included in the claims scope. Reference to an element in the singular is not intended to mean "one and only one" unless explicitly so stated, but rather "one or more." The scope of patented subject matter is defined only by the claims. The extent of legal protection is defined by the words recited in the allowed claims and their equivalents. All structural and functional equivalents to the elements of the above-described example embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. No claim is intended to invoke paragraph 6 of 35 USC §112 unless the words "means for" or "step for" are used. Furthermore, no feature, component, or step in the present disclosure is intended to be dedicated to the public regardless of whether the feature, component, or step is explicitly recited in the claims.

The invention claimed is:

1. A method for use in providing a roaming user of a mobile terminal access to communications services, comprising:
   receiving from the mobile terminal an access request that requires authentication or authorization with a home service network of the mobile terminal;
   providing a list of intermediary service networks generated or provided by the home service network;
   selecting from the list generated or provided by the home service network an intermediary service network to be used in authenticating or authorizing the mobile terminal with the home service network; and
   using the selected intermediary service network to convey the access request towards the home service network.

2. The method in claim 1, wherein the listed intermediary service networks are listed by priority, the method further comprising:
   selecting the intermediary service network with a highest priority on the list for which a route is known.

3. The method in claim 1, further comprising:
   after the receiving step, forwarding the access request to a central server, and
   then receiving from the central server the list of intermediary service networks, wherein each intermediary service network is identified in the list using a domain name or a fully-qualified domain name of an authentication server of the intermediary service network.

4. The method in claim 3, wherein the central server is a Diameter redirect agent used by a local access network at which the access request is received to route the access request from the mobile terminal for which access request no other route is known by the local access network, and
   wherein the access request is in a Diameter format, and domain names or fully-qualified domain names are included in Redirect-Host attribute value pairs (AVPs)

in a Diameter answer message sent to the local access network in response to the Diameter access request.

5. The method in claim 4, wherein the Diameter answer message includes a bit in a header and a result code AVP both set to indicate redirection.

6. The method in claim 4, wherein the access request includes an identity having a name part and a realm part, the realm part having a specific ending used by the local access network to send the access request to the redirect agent.

7. The method in claim 6, wherein the local access network selects from the list an intermediary service network with which the local access network is associated and forwards the access request to the selected intermediary service network, which intermediary service network recognizes the realm part and forwards the access request to the home service network.

8. The method in claim 7, wherein subsequent Diameter messages are conveyed between the local access network and the home service network by the selected intermediary service network.

9. The method in claim 4, wherein the list is updated in real time, manually, or semi-automatically.

10. The method in claim 1 used in combination with another scheme for selecting an intermediary cellular communication network based on input from the mobile terminal.

11. The method in claim 1, wherein an access network node selects from the list the intermediary service network to be used in authenticating or authorizing the mobile terminal with the home service network.

12. An apparatus in a local access network for use in providing a roaming mobile terminal access to communications services, comprising:
an access entity for receiving from the mobile terminal an access request that requires authentication or authorization with a home service network of the mobile terminal, and
a server, associated with the access entity, for obtaining a list of intermediary service networks provided by the home service network, selecting from the list provided by the home service network an intermediary service network to be used in authenticating or authorizing the mobile terminal with the home service network, and using the selected intermediary service network to convey the access request towards the home service network.

13. The apparatus in claim 12, wherein the listed intermediary service networks are listed by priority, the server being configured to select the intermediary service network with a highest priority on the list, for which intermediary service network a route is known.

14. The apparatus in claim 12, wherein the server is configured to forward the access request to another server and to receive from the other server the list of intermediary service networks, and wherein each intermediary service network is identified in the list using a domain name or a frilly-qualified domain name of an authentication or authorization server of the intermediary service network.

15. The apparatus in claim 14, wherein the access request includes an identity having a name part and a realm part, with the realm part having a specific ending, and wherein the server is configured to detect the specific ending and to then send the access request message to the other server.

16. The apparatus in claim 15, wherein the server is configured to select from the list an intermediary service network with which the local access network is associated and forward the access request to the selected intermediary service network which recognizes the realm part and forwards the access request to the home service network.

17. The apparatus in claim 16, wherein the server is configured to convey subsequent authentication, authorization, or accounting messages between the local access network and the home service network through the selected intermediary service network.

18. The apparatus in claim 12, wherein the list is updateable in real time, manually, or semi-automatically.

19. The apparatus in claim 12, wherein the server is configured to select from the list an intermediary service network with which the local access network is associated.

20. A network node for use in providing a roaming mobile terminal access to communications services, comprising:
a memory for storing a list of intermediary service networks generated or provided by a home service network of the mobile terminal, where the listed intermediary service networks are associated with the home service network, and
a server for receiving from a local access network an access request message associated with the mobile terminal that requires authentication with the home service network of the mobile terminal or the user of the mobile terminal, and in response, providing the stored list of intermediary service networks to the local access network,
wherein from which list an intermediary service network is selectable for use in authenticating the mobile terminal with the home service network.

21. The node in claim 20, wherein the list is updateable in real time, manually, or semi-automatically.

22. The node in claim 18, wherein the access request message is a Diameter access request message and the server is a Diameter redirect agent configured to redirect the access request message associated with the mobile terminal for which access request message the local access network has no other known route, and
wherein the Diameter redirect agent is configured to include domain names or fully-qualified domain names in Redirect-Host attribute value pairs (AVPs) in a Diameter answer message sent to the local access network in response to the Diameter access request message.

23. The node in claim 22, wherein the Diameter answer message includes a bit in a header and a result code AVP both set to indicate redirection.

24. The node in claim 20, wherein the server is configured to select from the list an intermediary service network.

25. A system for providing mobile terminals access to communications services, comprising:
a roaming mobile terminal associated with a network access identifier (NAI);
a home public land mobile network (PLMN) including a home PLMN access server and a list of intermediary PLMNs generated by the home PLMN;
multiple intermediary PLMNs, at least one of which is included in the list; a central access server;
a wireless local area network (WLAN) including an access client and a WLAN access server for receiving an access request message from the mobile terminal that requires authentication with the home PLMN, and in response, forwarding the access request message to the central access server;
wherein:
the central access server is configured to obtain from the home PLMN the list of intermediary PLMNs with which the home PLMN is associated and provide the list to the WLAN access server;

the WLAN access server is configured to select from the provided list an intermediary PLMN to be used in authenticating the mobile terminal with the home PLMN and forward the access request message to the selected intermediary PLMN; and the selected intermediary PLMN is configured to convey the access request message towards the home PLMN.

26. The system in claim 25, wherein the listed intermediary PLMNs are listed by priority, and the WLAN access server is configured to select the intermediary PLMN with a highest priority on the list, for which intermediary PLMN a route is known.

27. The system in claim 25, wherein after the receiving step, the WLAN access server is configured to forward the access request message to the central access server and then receive from the central access server the list of intermediary PLMNs, wherein each intermediary PLMN is identified in the list using a domain name or a fully-qualified domain name of an access server of the intermediary PLMN.

28. The system in claim 27, wherein the PLMNs are universal mobile telecommunications systems (UMTSs) and the authentication server, the central access server, the WLAN access server, and the home PLMN access server are authentication, authorization, and accounting (AAA) servers and the access client is an authentication, authorization, and accounting (AAA) client.

29. The system in claim 27, wherein the central access server is a Diameter Redirect-Agent used by the WLAN access server to route the access request message which is not routable by the WLAN access server, and wherein the access request message is in a Diameter format and domain names or fully-qualified domain names are included in Redirect-Host attribute value pairs (AVPs) in a Diameter answer message sent to the WLAN access server in response to the access request message.

30. The system in claim 29, wherein the Diameter answer message includes a bit in a header and a result code AVP set to indicate redirection.

31. The system in claim 25, wherein the WLAN access server is configured to select an intermediary PLMN using the list of intermediary PLMNs in combination with another scheme for selecting an intermediary PLMN based on input from the mobile terminal.

32. The system in claim 25, wherein the WLAN access server is configured to select an intermediary PLMN using the list.

* * * * *

UNITED STATES PATENT AND TRADEMARK OFFICE
CERTIFICATE OF CORRECTION

PATENT NO. : 7,292,592 B2 Page 1 of 1
APPLICATION NO. : 10/960782
DATED : November 6, 2007
INVENTOR(S) : Rune It is certified that error appears in the above-identified patent and that said Letters Patent is hereby corrected as shown below:

In Column 2, Line 50, delete "ppext" and insert -- pppext --, therefor.

In Column 19, Line 57, in Claim 14, delete "frilly" and insert -- fully --, therefor.

Signed and Sealed this

Second Day of September, 2008

JON W. DUDAS
*Director of the United States Patent and Trademark Office*